United States Patent
Nishijima et al.

(10) Patent No.: US 7,253,361 B2
(45) Date of Patent: Aug. 7, 2007

(54) CORRUGATE TUBE AND HARNESS STRUCTURE USING THE SAME

(75) Inventors: Masataka Nishijima, Shizuoka (JP); Naomi Kisu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/476,133

(22) Filed: Jun. 28, 2006

(65) Prior Publication Data
US 2007/0044989 A1 Mar. 1, 2007

(30) Foreign Application Priority Data
Aug. 23, 2005 (JP) .............................. 2005-240709

(51) Int. Cl.
*H02G 3/04* (2006.01)
(52) U.S. Cl. ................. 174/72 A; 174/72 C; 174/68.1; 174/135; 138/121
(58) Field of Classification Search ................ 138/121, 138/173; 174/480, 481, 504, 68.1, 68.3, 174/72 A, 72 C, 98, 100, 135
See application file for complete search history.

(56) References Cited

U.S. PATENT DOCUMENTS

| | | | | |
|---|---|---|---|---|
| 2,143,960 A * | 1/1939 | Stalter et al. | ............... | 138/121 |
| 3,578,777 A * | 5/1971 | DeGain | ....................... | 138/121 |
| 3,605,817 A * | 9/1971 | Bauman | ..................... | 138/121 |
| 3,715,454 A * | 2/1973 | Kleykamp | ................... | 138/121 |
| 5,564,472 A * | 10/1996 | Gipperich | ................... | 138/121 |
| 5,706,864 A * | 1/1998 | Pfleger | ....................... | 138/121 |
| 6,659,135 B2 * | 12/2003 | Sorkin | ......................... | 138/121 |
| 6,666,232 B2 * | 12/2003 | Lepoutre | .................... | 138/121 |
| 6,666,233 B1 * | 12/2003 | Sorkin | ......................... | 138/121 |
| 6,698,456 B2 * | 3/2004 | Neubauer et al. | ............ | 138/121 |
| 6,889,714 B1 * | 5/2005 | Sorkin | ......................... | 138/121 |

FOREIGN PATENT DOCUMENTS

| DE | 3151845 A1 * | 9/1982 | ................ 138/121 |
|---|---|---|---|
| JP | 4-62244 | 5/1992 | |
| JP | 10-148279 | 6/1998 | |
| JP | 2004-140963 | 5/2004 | |

* cited by examiner

*Primary Examiner*—Dhiru R. Patel
(74) *Attorney, Agent, or Firm*—Kratz, Quintos & Hanson, LLP

(57) ABSTRACT

In a corrugate tube as a flexible tube formed of ridges and grooves alternately arranged in a line, a rib is extended across the grooves in a longitudinal direction of the corrugate tube. A curved wall is formed on both sides of the ribs in each groove. A curved bottom wall is formed at a bottom of each groove. Electric wires are inserted into the corrugate tube. The folding corrugate tube is arranged in a case of a power-supplying device. The rib is disposed between outer and inner bending edges of the corrugate tube and extended in the longitudinal direction of the corrugate tube.

1 Claim, 5 Drawing Sheets

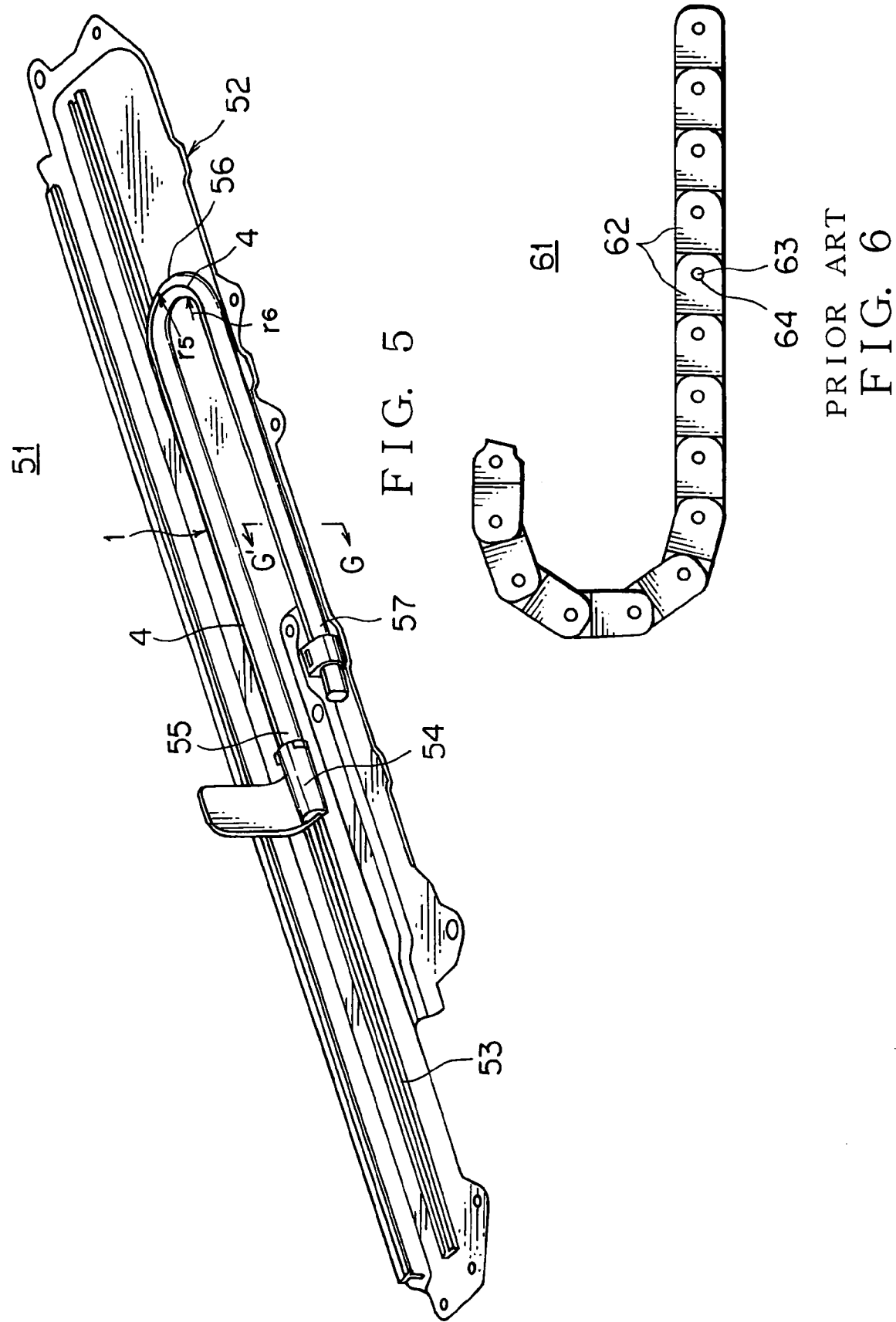

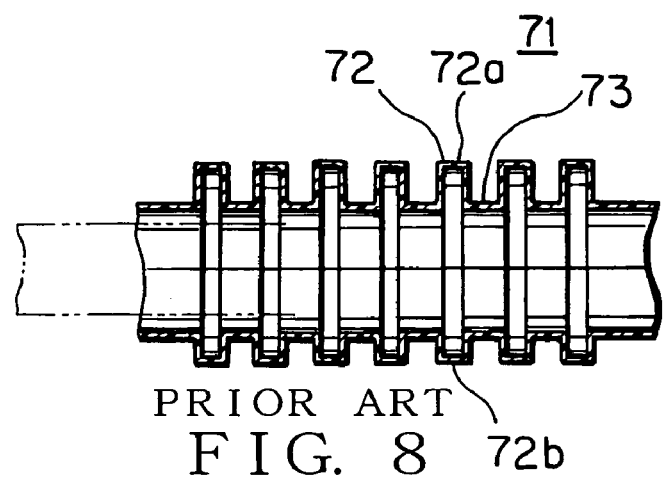
PRIOR ART
FIG. 8
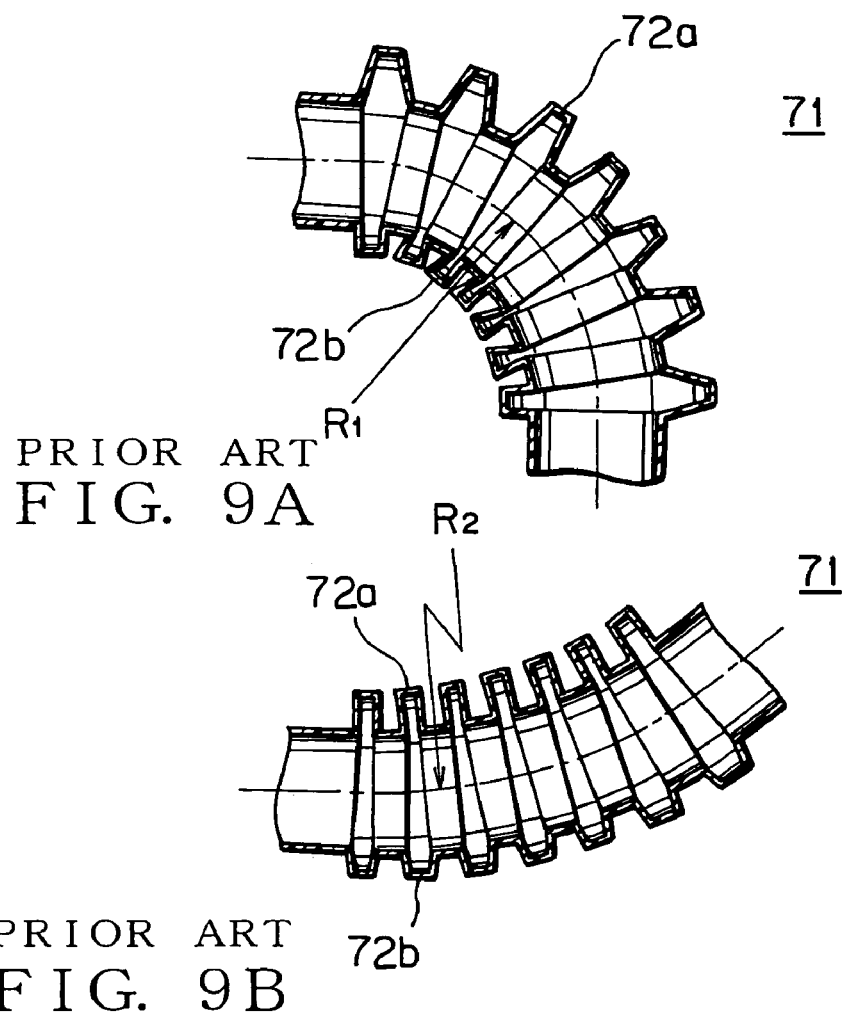
PRIOR ART
FIG. 9A
PRIOR ART
FIG. 9B

CORRUGATE TUBE AND HARNESS STRUCTURE USING THE SAME

CROSS REFERENCE TO RELATED APPLICATIONS

This application is based on Japanese Patent Applications No. 2005-240709, the content of which is hereby incorporated by reference.

BACKGROUND OF THE INVENTION

1. Field of the Invention

The present invention relates to a corrugate tube and a harness structure using the same that is arranged in a vehicle body or used for an electric power-supplying device to a sliding door or a sliding seat.

2. Description of the Related Art

FIG. 6 shows an embodiment of a conventional harness exterior component 61. FIG. 7 shows an embodiment of a harness structure using the harness exterior component 61. (See Japanese unexamined utility model specification No. H04-62244)

As shown in FIG. 6, the harness exterior component 61 is so-called "cable bare" and formed by a plurality of rectangular tubular pieces 62 made of synthetic resin, of which shafts 63 and holes 64 are mutually connected and extended like a caterpillar. The harness exterior component 61 is bendable in directions of the shafts 63 and unbendable in axis directions of the shafts 63.

As shown in FIG. 7, a wiring harness 65 having a plurality of insulator-coated electric wires is inserted into the harness exterior component 61. The wiring harness 65 is extracted from both edges of the harness exterior component 61 and connected to a battery and a load respectively. The harness exterior component 61 is folded in a U-shape and arranged on both upper and lower parts in parallel in an interior of a case 66.

One edge 65a of the harness exterior component 61 is fixed on the upper part of the case 66 and connected to a wiring harness of a vehicle body with a connector. The other edge of the harness exterior component 61 is movable in the case 66 and the wiring harness thereof is connected to a wiring harness of a seat side through a cover 67 of the case 66.

As shown in FIG. 7, as the seat 68 slides, the other end 65a of the wiring harness 65 is shifted back and forth, and the harness exterior component 61 is expanded or contracted. Because the harness exterior component 61 is not bendable in the axis directions of the shafts 63 (FIG. 6), the harness exterior component 61 is smoothly expanded or contracted only back and forth.

FIGS. 8 and 9 show a corrugate tube 71 made of synthetic resin as an embodiment of another conventional harness exterior component (See Japanese published patent application No. H10-148279).

Generally, the corrugate tube 71 is a flexible tube formed by arranging alternating ridges 72 and grooves 73. The corrugate tube 71 is formed by decentered ridges 72 and grooves 73. One side 72a of the ridge 72 is projected longer in a radial direction, while the opposed side 72b of the ridge 72 is projected shorter in the radial direction thereof.

The wiring harness having the coated wires is inserted into the corrugate tube 71 so that the wiring harness is protected from outer interference, rainwater, dust, and the like. The wiring harness is, for example, led out from both edges and connected to the battery and the load respectively.

As shown in FIG. 9A, the corrugate tube 71 is curved in a smaller radius R1 in which the shorter projections 72b are inside thereof. As shown in FIG. 9B, the corrugate tube 71 is curved in a larger radius R2 in which the longer projections 72a are inside thereof. Thus, the corrugate tube 71 can be bendable corresponding to a bending radius R of a vehicle body or the like so that the corrugate tube 71 is prevented from being rattled.

The corrugate tube 71 is made of synthetic resin and has a weak rigidity. However, the corrugate tube 71 may be formed by flexible ridges and grooves of waterproofed grommets made of synthetic rubber (See Japanese published patent application No. H10-148279).

However, for the harness exterior component 61, a process for connecting a plurality of pieces 62 is required. Therefore, the conventional wiring harness costs high. Further, the pieces 62 should be thick. Therefore, the conventional wiring harness is not suitable for a light-weighted wiring harness.

The conventional wiring harness having the corrugate tube 71 formed by resin molding as shown in FIG. 8 can be formed lighter and cost lower than the wiring harness having the harness exterior component 61 as shown in FIG. 6. However, when expanding and contracting the corrugate tube 71, the corrugate tube 71 may roll or snake. Therefore, the corrugate tube 71 may interfere with the case 66 and durability of the wires inside the corrugate tube 71 may be reduced.

Accordingly, an object of the present invention is to provide a corrugate tube having flexibility in a direction to be bent, and rigidity in a direction not to be bent and a harness structure using the corrugate tube.

SUMMERY OF THE INVENTION

In order to attain the object, according to the present invention, there is provided a corrugate tube formed of ridges and grooves alternately arranged in a line, including bend-preventing ribs each of which extends across the grooves in a longitudinal direction of the corrugate tube, both sides of the rib in the each groove being a curved wall.

According to the above, rigidity of the corrugate tube at a side having a rib increases, and the side having the rib is unbendable. The other side perpendicular to the side of the corrugate tube is bendable. In particular, the curved walls increase the bendability of the corrugate tube. The corrugate tube may have a rib or two ribs symmetrically. The corrugate tube may have a circular section, an oval section, or a rectangular section.

Preferably, a curved bottom wall is formed on a bottom of the each groove of the corrugate tube.

According to the above, the curved bottom wall compensates a reduction of the bendability of the corrugate tube due to the rib. A synergy effect of the curved wall and the curved bottom wall further increases the bendability of the corrugate tube. This is because the corrugate tube is bent in a direction of curving of the curved bottom wall.

Preferably, a pair of the ribs is disposed at both long diameter ends in a section of the corrugate tube having an oval or rectangular section.

According to the above, bending rigidity of the corrugate tube in a direction between the pair of the ribs increases. A synergy effect of the bending rigidity and the rigidity in a direction of the longer radius of the corrugate tube further prevents the corrugate tube from being bent at sides having the ribs. In contrast, the curved walls of each rib increase the bendability of the sides perpendicular to the sides having the ribs.

According to another aspect of the invention, there is provided a harness structure using the wiring harness described above, wherein electric wires are inserted into the corrugate tube, the corrugate tube is flexibly arranged in a curved shape, and the ribs are disposed between outer and inner bending edges of the corrugate tube and extended in a longitudinal direction of the corrugate tube.

According to the above, for example, the rib prevents the corrugate tube from shaking or snaking in a thickness direction of the case. Further, the curved walls at both sides of the rib increase the bendability of the corrugate tube. For example, the case is mounted on a sliding door, a slider is slidably mounted on the case, and the corrugate tube with the wiring harness is arranged in a U-shape and led out via the slider to a vehicle body. The wiring harness may be arranged in a sliding seat via the slider.

Preferably, in the harness structure using the corrugate tube, the ribs of the corrugate tube led out from the case are disposed between outer and inner bending edges of the corrugate tube and extended in a longitudinal direction of the corrugate tube.

According to the above, for example, when the harness is partially led out from the case at the sliding door to the vehicle body and bent back and forth corresponding to open and close of the sliding door, the ribs on the corrugate tube in the middle of the bending parts of the harness prevent the harness at the rib sides from shaking and snaking, and the curved walls on the corrugate tube in the middle of the ribs make the harness at the curved wall sides bendable.

These and other objects, features, and advantages of the present invention will become more apparent upon reading of the following detailed description along with the accompanied drawings.

BRIEF DESCRIPTION OF THE DRAWINGS

FIG. 5 is a perspective view showing another embodiment of the constantly power-supplying device using the corrugate tube;

FIG. 6 is a front view showing an embodiment of a conventional harness component;

FIG. 8 is a sectional view showing a conventional corrugate tube as the conventional harness component;

FIG. 9A is a sectional view showing the conventional corrugate tube bent in a small radius; and FIG. 9B is a sectional view showing the conventional corrugate tube bent in a large radius.

DETAILED DESCRIPTION OF THE PREFERRED EMBODIMENTS

Figure 1:
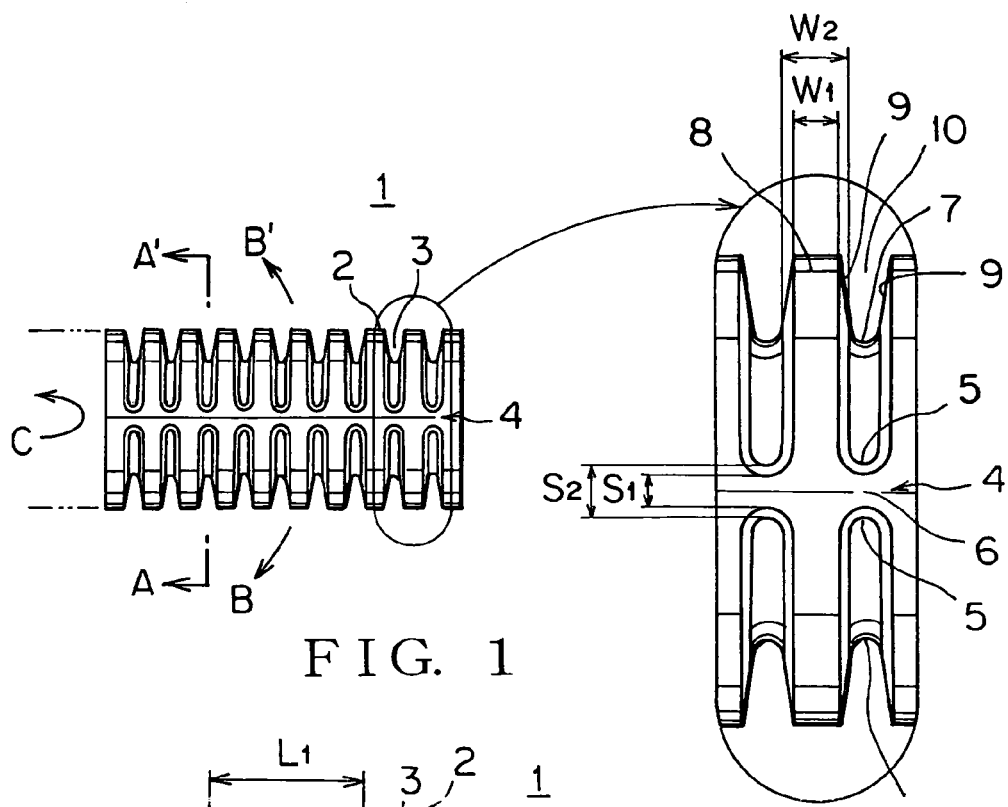
FIG. 1 is a front view showing an embodiment of a corrugate tube according to the present invention.

A corrugate tube 1 according to an embodiment of the present invention will be described with reference to FIGS. 1 to 5. The corrugate tube 1 is made of synthetic resin and formed by arranging alternating ridges 2 and grooves 3 in a same pitch in a longitudinal direction thereof. Bend-preventing ribs 4 connects the ridges 2 between the grooves 3 in lines in the longitudinal direction of the corrugate tube. Each curved wall 5 having a semicircular section is formed by curving both sidewalls of the rib 4 in between grooves 3. The corrugate tube has good bendability in directions from the center of the rib 4 toward the both curved walls (direction of an arrow B and B' in FIG. 1). The corrugate tube has strong rigidity in directions of bending the rib 4 (direction of an arrow C and C' in FIG. 1).

A backside wall of the curved wall of the rib 4 is disposed on the corrugate tube. A curved bottom wall 7 having a semicircular section is disposed on a bottom of the groove 3. Thus, the bendability of the corrugate tube 1 in the direction of the arrow B is increased. The curved bottom wall 7 includes two front and back curved walls.

A width $W_1$ of a top 8 of the ridge 2 is a little smaller than that of the conventional corrugate tube. An inner slope wall 9 connects the top 8 to the curved bottom wall 7. The width $W_1$ of the top 8 is a little narrower than that $W_2$ between the curved bottom walls 7. Accordingly, a width of an opening 10 is larger than that of the curved bottom wall 7.

Figure 2:
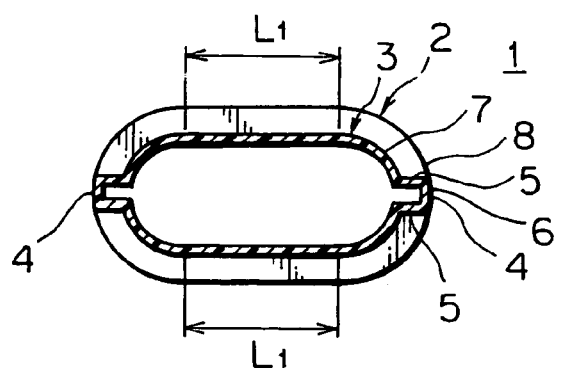
FIG. 2 is a sectional view showing the corrugate tube taken on line A-A' of FIG. 1.

As shown in FIG. 2, the rib 4 is composed of the upper and lower curved walls 5 extending from the curved bottom walls 7 and a top wall 6 connecting the curved walls 5 in a same plane as the top 8 of the ridge 2. An inside of the rib 4 is hollow. A bottom wall of the groove 3 is the curved bottom wall 7. The curved wall 5 connects the inner walls 9 to each other. A radius of the top wall 6 is the same as that of the top 8 of the ridge 2.

The corrugate tube 1 has an oval section and the ribs 4 are disposed at longer radius sides symmetrically. A line between the ribs 4 is a center line of the corrugate tube 1 in the longer radius. In FIG. 2, the oval section is composed of straight parts $L_1$ and the semicircular sections.

As shown in FIG. 1, the top wall 6 of the rib 4 is straight between the ridges 2 (in the groove 3) and extended in a whole length of the corrugate tube 1.

The curved walls 7 disposed at upper and lower sides of the rib 4 have semicircular sections. The curved walls 5 may not be extended to the inner walls 9 for improving the bendability.

The curved walls are extended a little obliquely from the top wall 8 to the curved bottom wall 7. An upper width $S_2$ of the rib 4 is larger than a lower width $S_1$ of the rib 4. In FIG. 2, the rib 4 has a substantially trapezoidal section. Accordingly, the bendability of the corrugate rube 1 is also improved. The sloped groove 3, and the curved walls 5, 7, makes resin-molding easier.

According to the above, when the corrugate tube 1 having electric wires is arranged in a vehicle body, an outer wall of the corrugate tube 1 is tightly fitted to the vehicle body to prevent rattle, noise, and friction of the corrugate tube 1.

Further, when the corrugate tube 1 is used for a sliding door or a sliding seat of a vehicle, because the ribs 4 improve the rigidity of the corrugate tube 1, shaking and snaking of the corrugate tube 1 in the case is prevented, and good bendability is also attained.

Typically corrugate tubes are made of "PP", or "PA". However, because the rigidity of the corrugate tube 1 is improved by the ribs 4, soft material such as "PE" can be used. Using the soft material further improves the bendability of the corrugate tube 1.

According to the above, the curved walls 5 are sloping walls. However, the curved walls may be vertical walls, or curved walls. Further, the inner walls 9 may be curved walls. The curved bottom walls 7 may be flat walls. Even in this case, the curved walls 5 are required.

The corrugate tube 1 in FIG. 2 has an oval section. However, the corrugate tube 1 may have a circular section. Even in this case, the curved walls 5 are required. The corrugate tube 1 in FIG. 2 has two ribs 4. However, the corrugate tube 1 having the oval or circular section may have a rib 4. The rigidity of the corrugate tube 1 at the rib 4 is larger than that at opposite side when the corrugate tube 1 has one rib 4.

Further, in the corrugate tube 1, the ribs 4 are formed integrally with the ridges 2 in the same height as the ridges 2. However, the rib 4 may be about half or three-fourth the height of the ridge 2, and the top wall 6 may cross the inner walls 9. Even in this case, the curved walls 5 are required. When the rib 4 is the same height as the ridges 2, the corrugate tube 1 is easily molded.

Typically, there is a corrugate tube that has a slit through which the wires are inserted into the corrugate tube, another corrugate tube that has wrapped slits, and the other corrugate tube that has no slit but openings through which the wires are inserted. The corrugate tube 1 is effective for all of the corrugate tubes. If the corrugate tube 1 has a slit, preferably, the slit is disposed at right angle from the rib 4.

Figure 3:
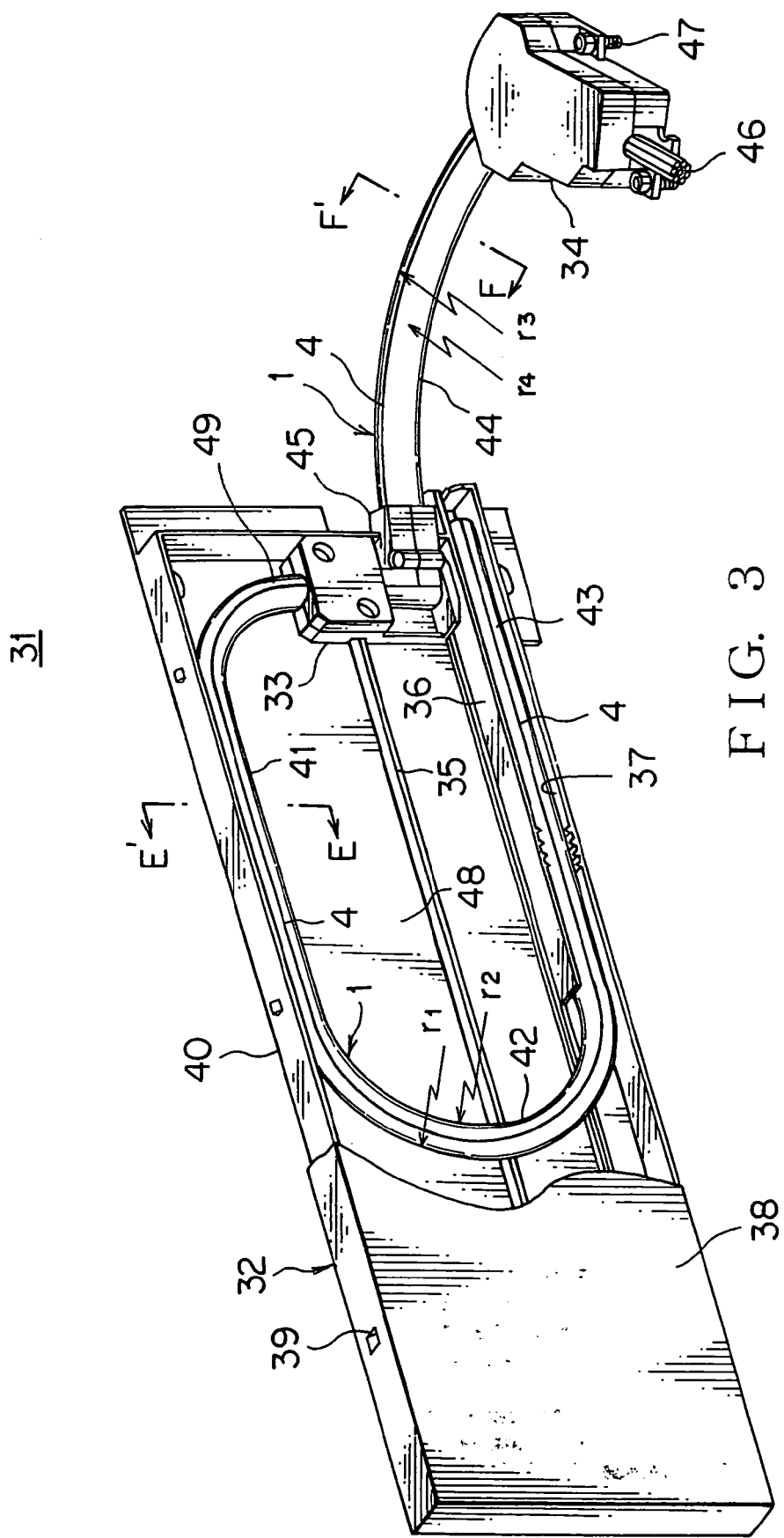
FIG. 3 is a perspective view showing an embodiment of a constantly power-supplying device using the corrugate tube.
Figure 7:
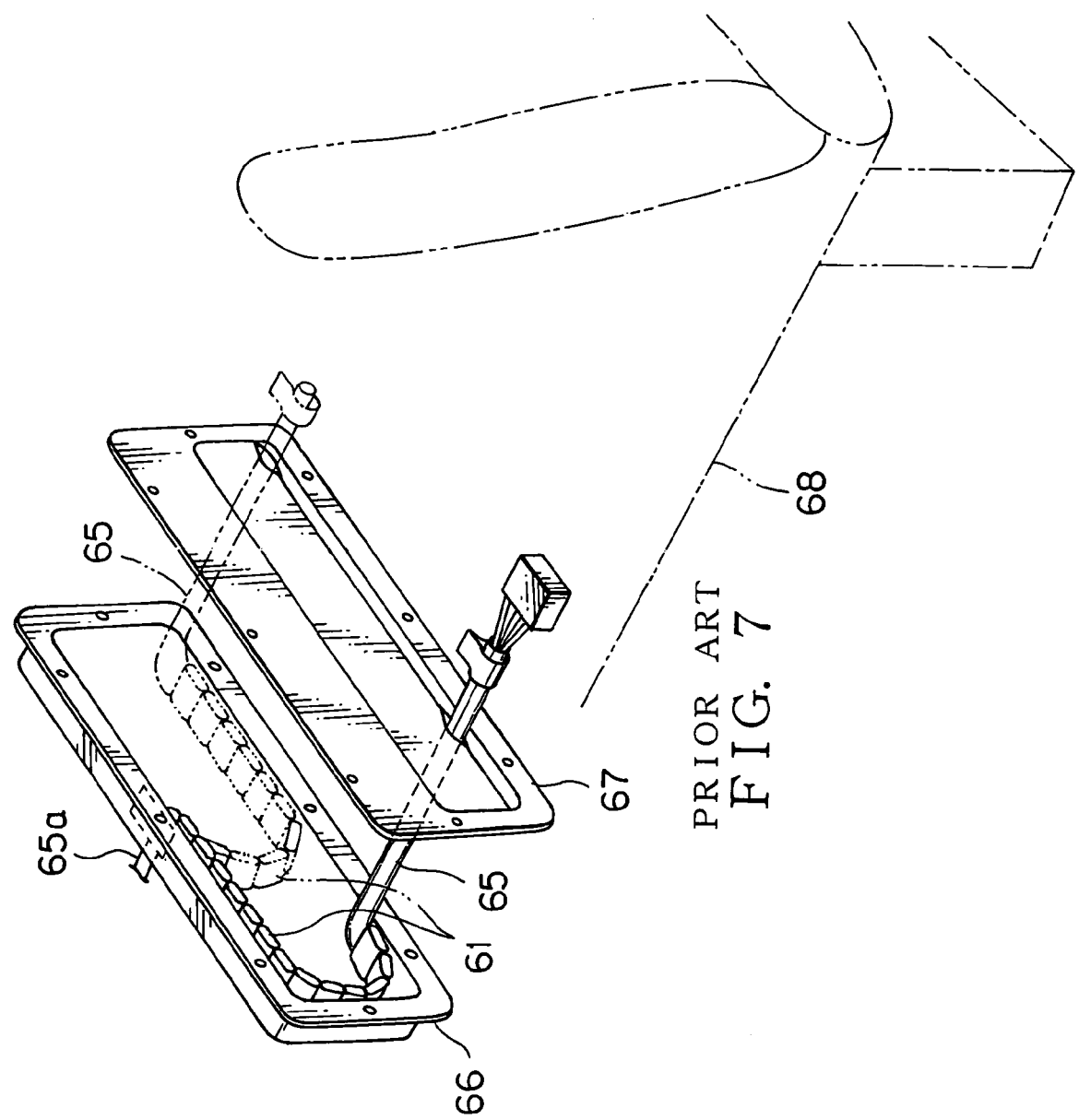
FIG. 7 is an exploded perspective view showing a power-supplying device using the conventional harness component.

FIG. 3 shows an embodiment in which the corrugate tube 1 is used for a constantly power-supplying device 31 in a sliding door. The constantly power-supplying device 31 includes a rectangular standing case 32 made of synthetic resin, a slider 33 slidably disposed in the case, a wiring harness having the corrugate tube 1 which is folded in a U-shape in the case 32 and led out to a harness holder (rotary clamp) 34 at a vehicle body side through the slider 33.

The case 32 includes a case body 40, a guiding rail 35 disposed horizontally in substantially the middle of the case body 40, a lower partition wall 36, a harness path 37 disposed inside the partition wall 36, and a cover 38. The cover 38 is fixed on the case body 40 with a locking member 39 composed of such as a locking hole and a locking projection. The case body 40 is fixed to a door panel (not shown). A lower part 43 of the wiring harness is led out from the case body 40 to the door, and connected to a wiring harness (not shown) at the door side.

The clamp 45 is swingably disposed on the slider 33. An upper part 41 of the wiring harness is led out of the case 32 through the clamp 45. A horizontal part 44 of the wiring harness is extended to the harness holder 34 via a vehicle body (not shown). The wire 46 is led out from the harness holder 34 to the vehicle body and connected to a wiring harness at the vehicle body (battery side). The harness holder 34 swings about a pin 47, however, an inner clamp (not shown) with the corrugate tube 1 rotates to absorb its curl.

Figure 4A:
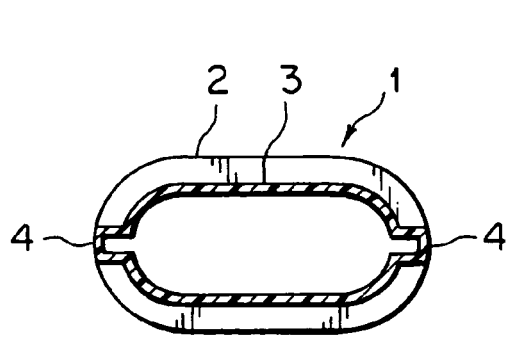
FIG. 4A is a sectional view showing the corrugate tube taken on line E-E' of FIG. 3.
Figure 4B:
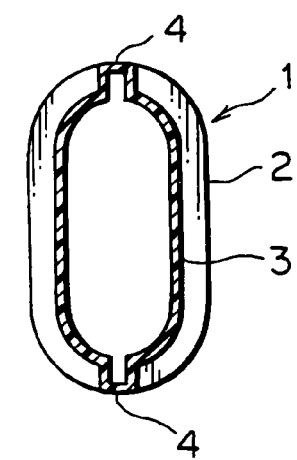
FIG. 4B is a sectional view showing the corrugate tube taken on line F-F' of FIG. 3.

The corrugate tube 1 in the case 32 lies down as shown in FIG. 4A, and stands up at the horizontal part 44 of the wiring harness as shown in FIG. 4B.

The ribs 4 are disposed in between outer curve $r_1$ and inner curve $r_2$ of a curving part 42 of the corrugate tube 1. Also, the ribs 4 are disposed in between outer curve $r_3$ and inner curve $r_4$ of a curving part 44 of the corrugate tube 1 out of the case 32.

In FIG. 3, the sliding door at a left side of the vehicle body is fully opened. Therefore, as the sliding door is closed, the slider 33 moves backward. Further, the upper part 41 of the wiring harness is shortened, and the lower part 43 of the wiring harness is elongated. Thus, the wiring harness is curved in substantially a J-shape. The curving part 42 of the wiring harness moves backward.

In this case, the ribs 4 prevent the corrugate tube 1 from swinging or snaking. Interference between the corrugate tube 1 and the case 32, noise, and frictions are prevented. Further, because the curved walls 5 are bendable, the corrugate tube 1 in the case is bendable especially at a rising part 49 and at the curving part 42. Further, the curved walls 5 prevent the ribs 4 from being deformed and damaged.

Further, the part 44 of the wiring harness is bent about the harness holder 34 to be relatively moved backward with the slider 33.

In this case, the ribs 4 of FIG. 4B prevent the part 44 of the wiring harness from shaking and snaking. Further, the curved walls 5 improve the bendability of the part 44 of the wiring harness.

When the sliding door is opened from the fully closed state, the ribs 4 and the curved walls 5 functions the same as when the door is closed. Incidentally, because the part 43 of the wiring harness does not bend, the ribs 4 are not required at the part 43.

FIG. 5 shows an embodiment in which the corrugate tube 1 is used for a constantly power-supplying device 51 in a sliding seat of a vehicle. The constantly power-supplying device 51 includes a metallic oblong case 52 lying down on the vehicle body, a guiding rail 52, a cover (not shown), a slider 54 slidably engaged with the guiding rail 52, and a wiring harness having the corrugate tube 1 curved in a U-shape in the case 52. An end of the corrugate tube 1 is fixed to the slider 54, and the other end of the corrugate tube 1 is fixed to the case 52.

The slider 54 is connected to the sliding seat. A part 55 of the wiring harness is connected to auxiliaries in the sliding seat. A part 57 of the wiring harness is connected to a battery through such as a floor-harness (not shown). As shown in FIG. 4B, the corrugate tube 1 has ribs 4. The ribs 4 are disposed in between an outer curving $r_5$ and an inner curving $r_6$ of a curving part 56 of the wiring harness.

When the sliding seat is slid back and forth, the slider 54 is also slid back and forth integrally and the wiring harness is expanded and contracted. The curving part 56 of the wiring harness is also moved. The ribs 4 prevent the wiring harness from shaking and snaking. The curved walls 5 improve the bendability of the curving part 56 of the wiring harness.

Other power-supplying devices can be used according to the present invention. The power-supplying device 31 in FIG. 3 may be mounted on the vehicle body and the harness holder may be mounted on the sliding door. A device like the power-supplying device 31 may be used for such as a rotary rear door.

According to the invention described above, the power-supplying device with the corrugate tube 1 can be compacted. According to the invention, bending durability of the corrugate tube 1 is improved.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A harness structure comprising a corrugate tube formed of ridges and grooves alternatively arranged in a line, including bend-preventing ribs, each of said ribs having a top wall that is straight between the ridges, and in the same plane as a top of the ridges, and extends across the grooves in a longitudinal direction of the whole length of the corrugate tube, both sides of each of said bend-preventing ribs in each of said grooves being a curved wall, wherein the ribs of the corrugate tube led out from a case are disposed between outer and inner bending edges of the corrugate tube and extended in a longitudinal direction of the corrugate tube, and the ribs are disposed at both long diameter ends in a section of the corrugate tube, and wherein electric wires are inserted into corrugate tube, and the corrugate tube is flexibly arranged in a curved shape.

* * * * *